C. O. JOHNSON.
ANTIFRICTION BEARING.
APPLICATION FILED JUNE 30, 1909.
1,005,041.
Patented Oct. 3, 1911.
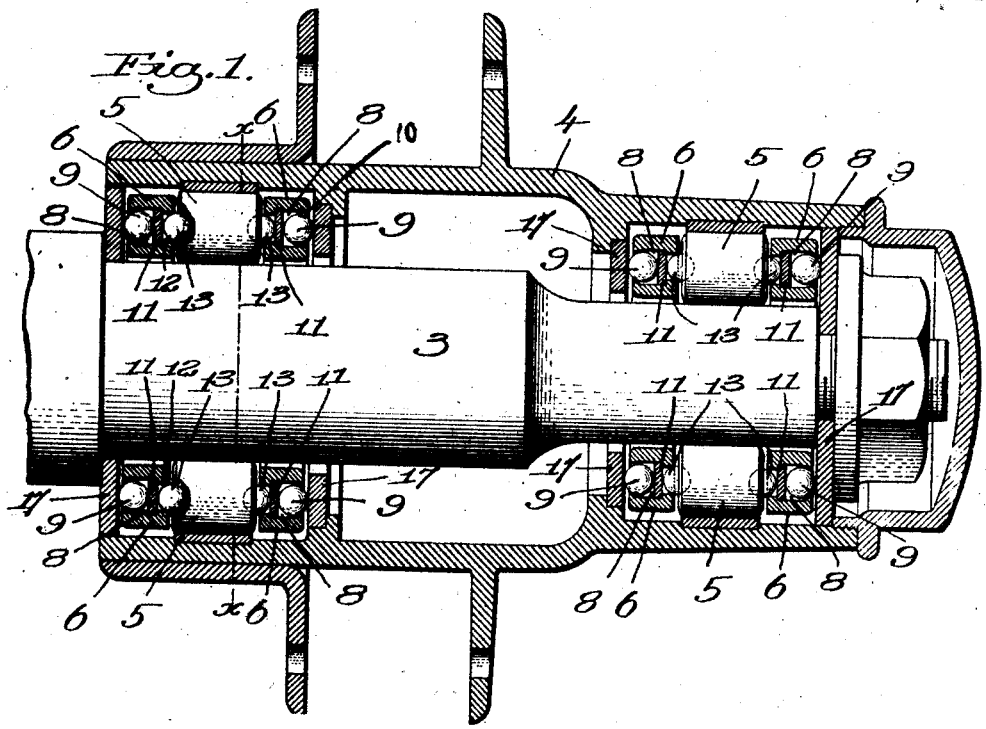
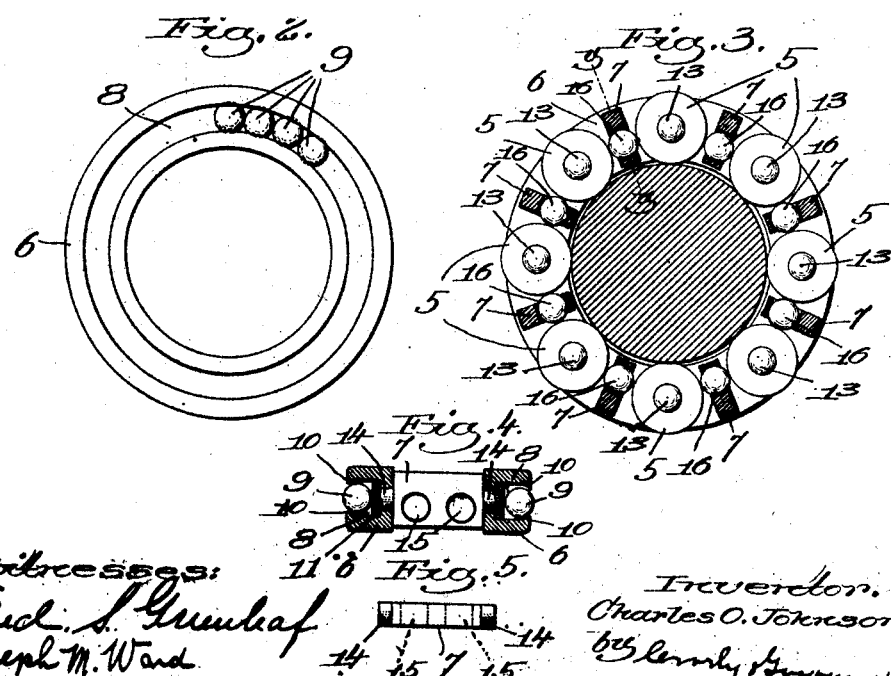

UNITED STATES PATENT OFFICE.

CHARLES O. JOHNSON, OF BOSTON, MASSACHUSETTS.

ANTIFRICTION-BEARING.

1,005,041.   Specification of Letters Patent.   Patented Oct. 3, 1911.

Application filed June 30, 1909. Serial No. 505,130.

*To all whom it may concern:*

Be it known that I, CHARLES O. JOHNSON, a citizen of the United States, residing at Boston, county of Suffolk, and State of Massachusetts, have invented an Improvement in Antifriction-Bearings, of which the following description, in connection with the accompanying drawing, is a specification, like characters on the drawing representing like parts.

This invention relates to anti-friction bearings and is in the nature of an improvement on the anti-friction bearing shown in my Patent No. 861,592, dated July 30, 1907. The device shown in said patent comprises a cage adapted to surround the axle and comprising two rings, each provided with ball-receiving apertures, bearing rollers inserted between said rings and provided with recesses in their ends, and balls received in the apertures in said rings and also received in the recesses in the ends of the bearing rollers, said balls acting to resist end-thrust, and also constituting the means for retaining the bearing rollers in place. Said device also comprises a plurality of spacing rollers for spacing the bearing rollers, which spacing rollers are mounted on the tie rods that connect the rings of the cage.

In my present improvement, I employ the cage comprising the two rings between which the bearing rollers are received, each bearing roller being cupped at its ends, and I also provide a plurality of balls which are received in openings through the rings and which set into the recesses in the ends of the rolls, all as described in said patent. In my present invention, however, I provide each ring with a ball-receiving groove in its outer side face, and I place in such groove a plurality of balls which bear against the end face of the housing. And I also space and aline the bearing rollers by means of spacing balls that are retained in apertures in the tie bars. In my present improvement I have, therefore, a series of balls for holding the bearing rollers in place and providing end-thrust bearing therefor, a series of balls to take the end-thrust, and another series of balls to separate and aline the load-carrying or bearing rollers.

Referring now to the drawings wherein I have illustrated a selected embodiment of my invention, Figure 1 shows a hub of a wheel having my anti-friction bearing therein; Fig 2 is an end view of the bearing; Fig. 3 is a section through the bearing on the line *x—x*, Fig. 1; Fig. 4 is a section on the line *y—y*, Fig. 3; Fig. 5 is a detail view showing one of the tie-bars that connect the two rings of the cage together.

For the sake of illustration, the invention is shown as embodied in the hub of a wheel, but it will be obvious, of course, that the bearing is capable of a general use and is not confined to wheel hubs.

In the drawings, 3 designates the axle and 4 the hub of the wheel. I have shown said hub as provided with two bearings, one at each end, but as both bearings are alike, a description of one will suffice.

The bearing rollers of my improved bearing are shown at 5 and they are sustained by a cage which is formed with the two rings 6 that are rigidly secured together by the tie-bars 7. Each ring 6 is provided with a ball-receiving groove 8 in its outer face in which groove is received a plurality of balls 9 that are adapted to take the end-thrust, the outer edge of the walls of the groove preferably being spun over as at 10, so as to form lips for holding the balls 9 in place. Each ring 6 is also provided with a plurality of ball-receiving openings 12 in which are received balls 13 that are designed to retain the bearing rolls 5 in place and to furnish end thrust bearings therefor. For this purpose each of the rollers 5 is provided at its end with a recess to partially receive the ball 13, as clearly seen in Fig. 1. Since the tie-bars 7 rigidly connect the two rings 6, it will be seen that the balls 13 act as trunnions for the bearing rolls 5 and not only serve to hold said rollers in position, but also constitute end-thrust bearings therefor. The tie-bars 7 may be of any suitable shape and may be secured to the rings in any appropriate way. I have shown herein each tie-bar as provided with the tenon portions 14 which are received in apertures in the rings 6, said tenon portions or projections being headed over so as to rigidly connect the rings. A steel washer 11 is placed in the bottom of each groove 8 to cover the headed ends of the tenons 14 and also to separate the balls 9 from the balls 13. The tie-bars 7 are shown as provided with ball-receiving apertures 15 in which are received spacing balls 16. There may be as many spacing balls in each tie-bar as desired according to the length of said tie-bar and the size of the bearing. I have herein shown two such spacing balls in each tie-bar. These spacing balls are retained between the bearing rolls and serve to keep them in alinement and properly space the same, and also to constitute anti-friction separators therefor. The balls 9 bear against the end walls 17, which in this case are a washer on the axle on one end and the nut on the other end.

From the above it will be seen that in my present embodiment, there is one series of balls to support the bearing rollers and another series of balls to take the end-thrust, and also that the bearing rollers are held parallel and spaced by means of balls which are received in apertures formed in the tie-bars.

Having fully described my invention, what I claim as new and desire to secure by Letters Patent is:—

1. In an anti-friction bearing, the combination with an axle, of a cage surrounding the axle and comprising two connected rings each having a ball-receiving groove in its outer side face and each having ball-receiving openings through the inner wall, a washer in the bottom of each groove, bearing rollers situated between the rings and provided with recesses in their ends, balls received partially in the openings in the rings and partially in the recesses in the ends of the bearing rollers, and a series of balls in the ball-receiving groove in the outer side face of each ring.

2. In an anti-friction bearing, the combination with an axle, of a cage surrounding the axle and comprising two rings each having a ball-receiving groove in its outer side face and each having a plurality of ball-receiving openings through its inner wall, bearing rollers situated between the rings and having recesses in their end faces, balls received partially in the recesses in the rollers and partially in the openings in the ring, tie-bars rigidly connecting the rings and provided with ball-receiving openings, spacing balls occupying said openings and situated between and spacing and alining the bearing rollers, a series of balls in the groove in each ring to eliminate end-thrust, and a washer in the bottom of each groove for separating the balls therein from the balls in the ball-receiving recesses in the ring.

3. In an anti-friction bearing, the combination with an axle, of a cage surrounding the axle and comprising two connected rings each having a ball-receiving groove in its outer side face and each having ball-receiving openings through its inner wall, bearing rollers situated between the rings and provided with recesses in their ends, a series of balls received partially in the openings in the rings and partially in the recesses in the ends of the bearing rollers, a series of balls in the ball-receiving groove in the outer side face of each ring and a separating member between the two series of balls.

4. In an anti-friction bearing, the combination with an axle, of a cage surrounding the axle and comprising two rings each having a ball-receiving groove in its outer side face and each having a plurality of ball-receiving openings through its inner wall, bearing rollers situated between the rings and having recesses in their end faces, balls received partially in the recesses in the rollers and partially in the openings in the ring, tie-bars rigidly connecting the rings and provided with ball-receiving openings, spacing balls occupying said openings and having their centers in a circle of less radius than the circle in which the centers of the end spacing balls lie, a series of balls in the groove in each ring, and a washer in the bottom of each groove for separating the balls therein from the balls in the ball-receiving recesses in the ring.

In testimony whereof, I have signed my name to this specification, in the presence of two subscribing witnesses.

CHARLES O. JOHNSON.

Witnesses:
BERTHA F. HEUSER,
THOMAS J. DRUMMOND.